US008533766B2

(12) United States Patent
Medina et al.

(10) Patent No.: US 8,533,766 B2
(45) Date of Patent: *Sep. 10, 2013

(54) SYSTEM AND METHOD FOR MONITORING DELIVERY OF MEDIA CONTENT BY A MEDIA COMMUNICATION SYSTEM

(71) Applicant: AT&T Intellectual Property I, LP, Atlanta, GA (US)

(72) Inventors: Douglas Medina, Grain Valley, MO (US); Jeffrey W. Zimmerman, Lenexa, KS (US); Frank Coppa, North Kansas City, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/669,573

(22) Filed: Nov. 6, 2012

(65) Prior Publication Data

US 2013/0067506 A1    Mar. 14, 2013

Related U.S. Application Data

(63) Continuation of application No. 12/115,066, filed on May 5, 2008, now Pat. No. 8,359,621.

(51) Int. Cl.
*H04N 7/173* (2011.01)
*G10L 15/04* (2013.01)
*G10L 21/00* (2013.01)

(52) U.S. Cl.
USPC ........... 725/107; 725/105; 725/119; 704/251; 704/270.1

(58) Field of Classification Search
USPC ................ 725/105, 107, 114, 116, 118, 119, 725/138, 144, 146, 148; 705/304; 348/180, 348/192; 704/231, 251, 270, 270.1
See application file for complete search history.

(56) References Cited

U.S. PATENT DOCUMENTS

| | | | |
|---|---|---|---|
| 6,510,427 B1 | 1/2003 | Bossemeyer |
| 7,380,265 B2 | 5/2008 | Jensen |
| 2002/0078440 A1 | 6/2002 | Feinberg |
| 2004/0031059 A1 | 2/2004 | Bialk |
| 2007/0047542 A1 | 3/2007 | Thukral |
| 2007/0058043 A1 | 3/2007 | Thukral |
| 2007/0283400 A1 | 12/2007 | Lee |
| 2007/0283401 A1 | 12/2007 | Lee |
| 2008/0195614 A1 | 8/2008 | Lutz |

*Primary Examiner* — John Schnurr
(74) *Attorney, Agent, or Firm* — Guntin & Gust, PLC; Ed Guntin

(57) ABSTRACT

A system that incorporates teachings of the present disclosure may operate according to, for example, a method involving recording audio feedback from a plurality of subscribers commenting on media content supplied by a media communication system on at least one of a plurality of media channels, detecting one or more trigger words in the recorded audio feedback having an association with a disruption of one or more media services supplied by the media communication system, selecting one or more network elements of the media communication system in at least one transmission path that supplies media services to one or more of the plurality of subscribers that supplied audio feedback matching the one or more trigger words, and directing the selected one or more network elements to record media content on one or more media channels selected from the plurality of media channels. Other embodiments are disclosed.

20 Claims, 7 Drawing Sheets

400

SYSTEM AND METHOD FOR MONITORING DELIVERY OF MEDIA CONTENT BY A MEDIA COMMUNICATION SYSTEM

CROSS-REFERENCE TO RELATED APPLICATIONS

This application is a divisional of U.S. patent application Ser. No. 12/115,066 filed May 5, 2008 which is incorporated herein by reference in its entirety.

FIELD OF THE DISCLOSURE

The present disclosure relates generally to media communication systems and more specifically to a system and method for monitoring delivery of media content by a media communication system.

BACKGROUND

Common media communication systems such as Internet Protocol Television (IPTV) systems, cable TV systems, satellite TV systems, or Internet content distribution systems (e.g., iTunes™) can deliver audio content, video content, or combinations thereof to computing devices such as a set-top box, a digital video recorder, media players (e.g., iPod™), media-capable phones (e.g., iPhone™), and so on. Complex media communication systems such as these can periodically experience interruptions in delivering content to these consumption devices for a variety of reasons.

DETAILED DESCRIPTION

One embodiment of the present disclosure entails a method involving recording audio feedback from a plurality of subscribers commenting on video content services supplied by an Internet Protocol Television (IPTV) communication system, detecting one or more trigger words in the recorded audio feedback, detecting a frequency of use of the one or more trigger words that exceeds a threshold, and directing one or more network elements of the IPTV communication system to record video content from a select one or more video content channels.

Another embodiment of the present disclosure entails a computer-readable storage medium having computer instructions for detecting one or more trigger words in recorded audio feedback of a plurality of subscribers commenting on video content services supplied by an IPTV communication system, and directing one or more network elements of the IPTV communication system to record video content from a select one or more video content channels.

Yet another embodiment of the present disclosure entails a recording device having a controller to record video content from a select one or more video content channels of an IPTV communication system responsive to receiving a directive from a system detecting one or more trigger words in recorded audio feedback of a plurality of subscribers commenting on video content services supplied by the IPTV communication system.

Another embodiment of the present disclosure entails a service center system providing support services to a plurality of subscribers of an IPTV communication system having a controller to request video content recorded by a network element of the IPTV communication system. The network element recorded video content based on a detection of one or more trigger words in recorded audio feedback of a portion of the plurality of subscribers commenting on video content supplied by the IPTV communication system.

Yet another embodiment of the present disclosure entails a method involving recording audio feedback from a plurality of subscribers commenting on media content supplied by a media communication system on at least one of a plurality of media channels, detecting one or more trigger words in the recorded audio feedback having an association with a disruption of one or more media services supplied by the media communication system, selecting one or more network elements of the media communication system in at least one transmission path that supplies media services to one or more of the plurality of subscribers that supplied audio feedback matching the one or more trigger words, and directing the selected one or more network elements to record media content on one or more media channels selected from the plurality of media channels.

Figure 1:
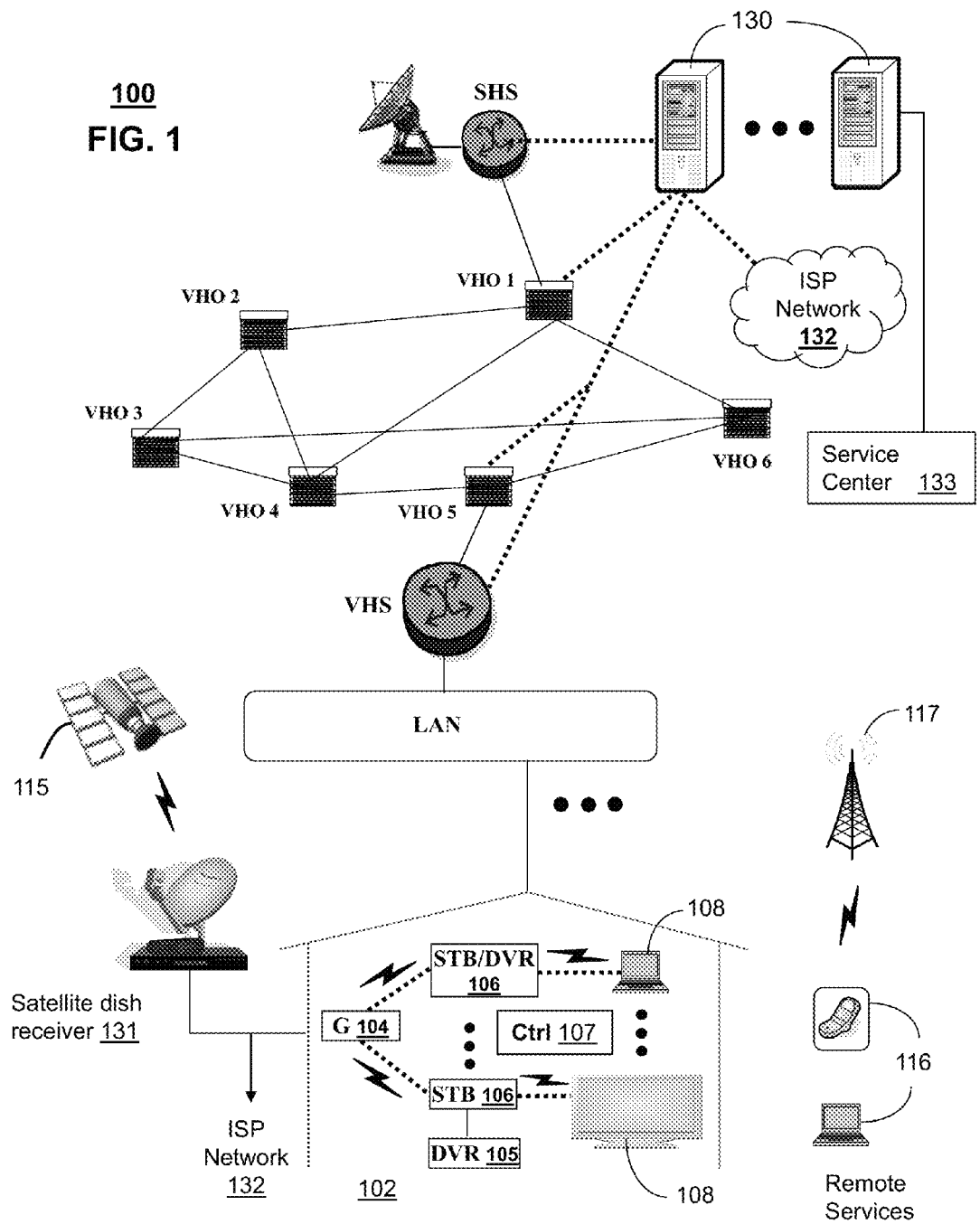
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) with a built-in digital video recorder (DVR) or coupled to one thereto. The STBs in turn present broadcast selections to media devices 108 such as computers or television sets managed in some instances by a media controller 107 (e.g., an infrared or RF remote control).

Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as an Automated Response Unit (ARU) 130 for processing recordings of conversations between subscribers of the first communication system 100 and agents (human and/or interactive voice response or IVR systems) of a service center 133. Commonly, service centers 133 record conversations of subscribers to improve quality of service. These conversations can take place with human agents and/or IVRs during the course of assisting subscribers to address service issues. The ARU 130 can be coupled to computing devices at the service center 133 recording these conversations to periodically monitor for predetermined trigger words defined by the service provider of the first communication system 100 utilizing common voice recognition technology. When trigger words are detected, the ARU 130 can under some circumstances take measures to mitigate potential service disruptions.

To assist the ARU 130 in this regard, the service provider can include in one or more network elements in the first communication system 100 (e.g., SHS, VHO, VHS, service area interface or SAI, customer's premise equipment, etc.) digital video recording equipment to record video content from one or more video channels of interest. The equipment used by network elements can inherently provide a digital video recording feature, or a common DVR or STB with a built-in DVR can be coupled to a video port of the network element to facilitate video recordings as directed by the ARU 130. The recorded video content can be accessed by the service center 133 by way of the ISP network 132 which can be communicatively coupled to the network elements of FIG. 1, or by other common networking means.

It should be further noted that a satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
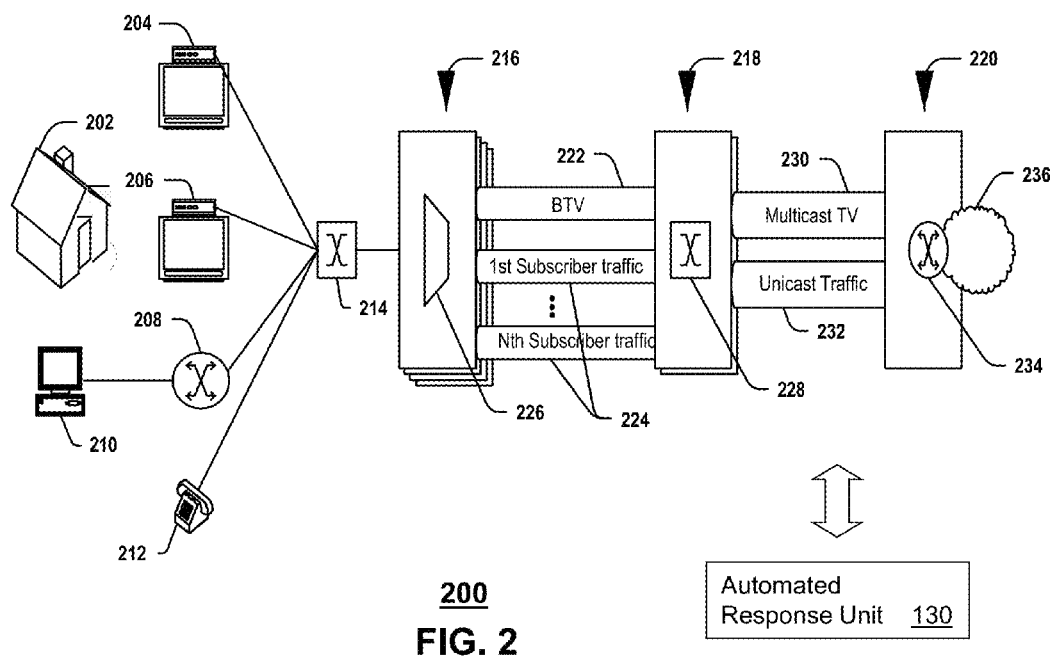

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The ARU 130 and service center 133 of FIG. 1 can be operably coupled to the second communication system 200 for purposes similar to those described above.

Figure 3:
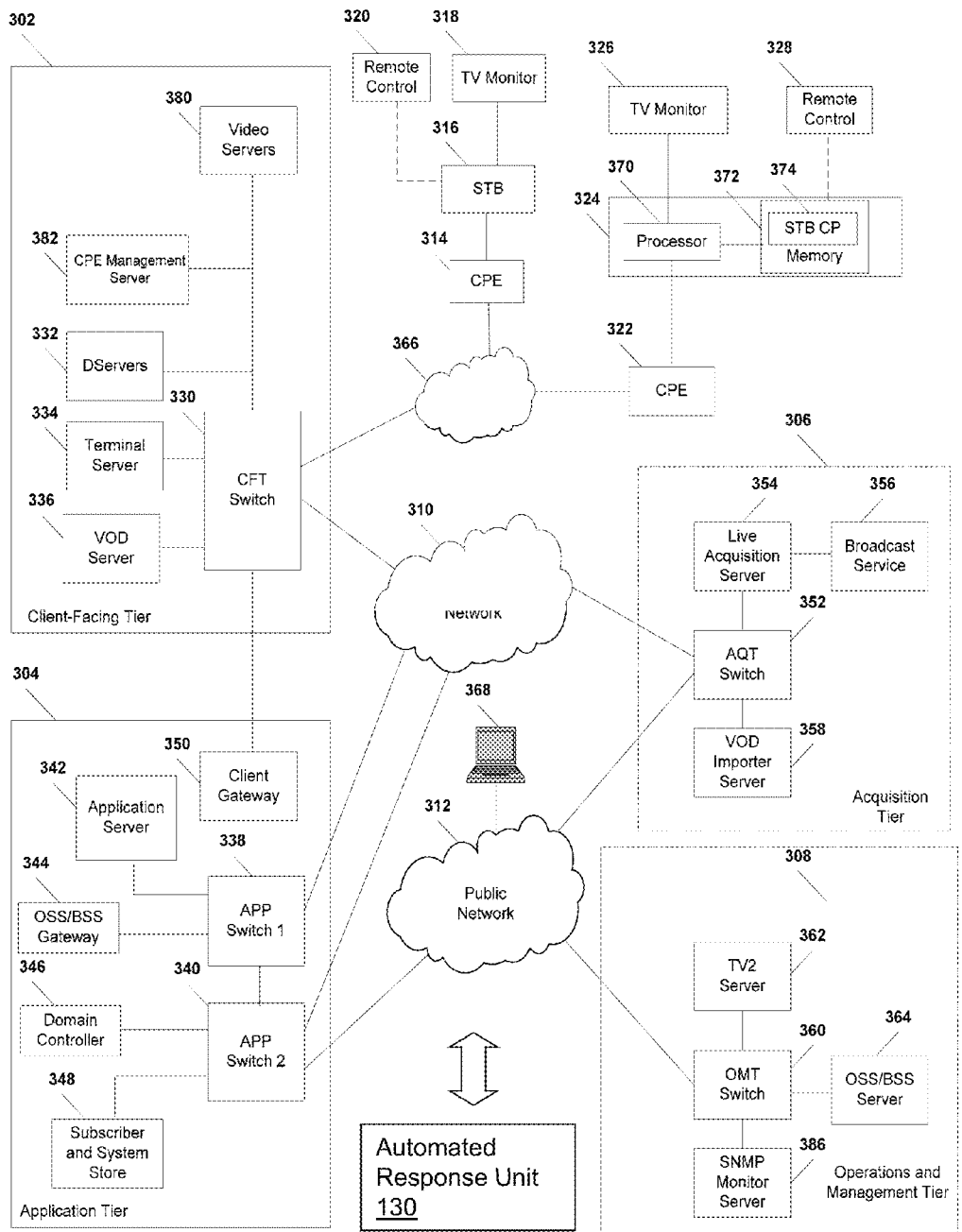

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The ARU 130 and service center 133 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
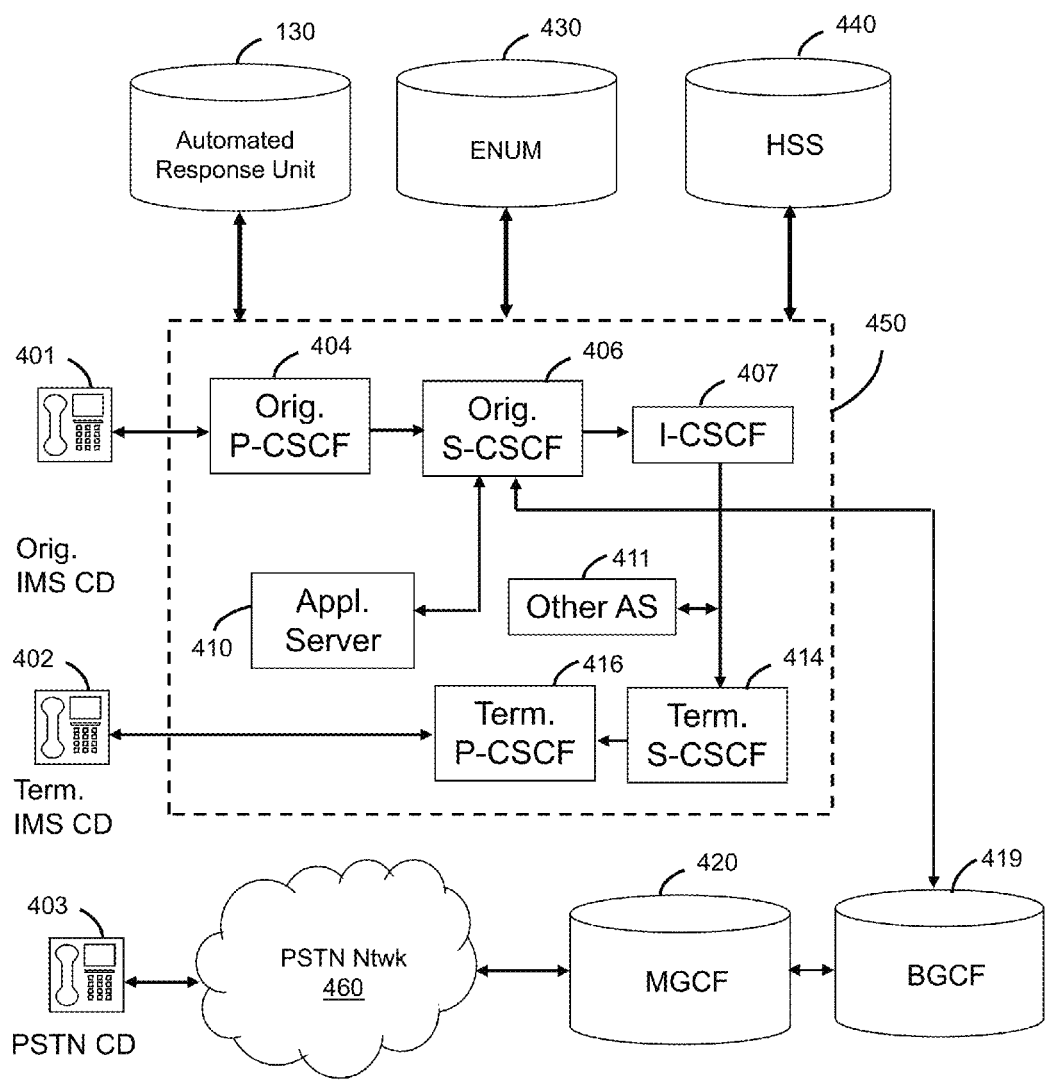

FIG. 4 depicts an exemplary embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the ARU 130 and service center 133 previously discussed for FIG. 1. In this representative embodiment, the ARU 130 or service center 133 can be accessed over a PSTN or VoIP channel of communication system 400 by common techniques such as described above.

Figure 5:
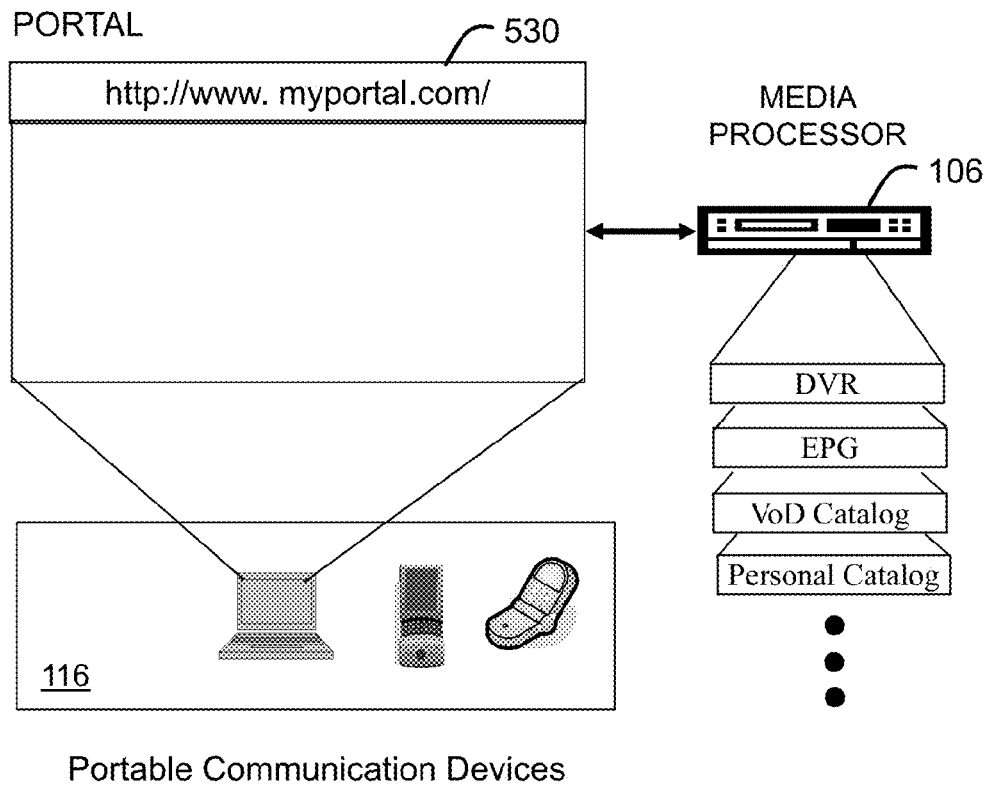
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
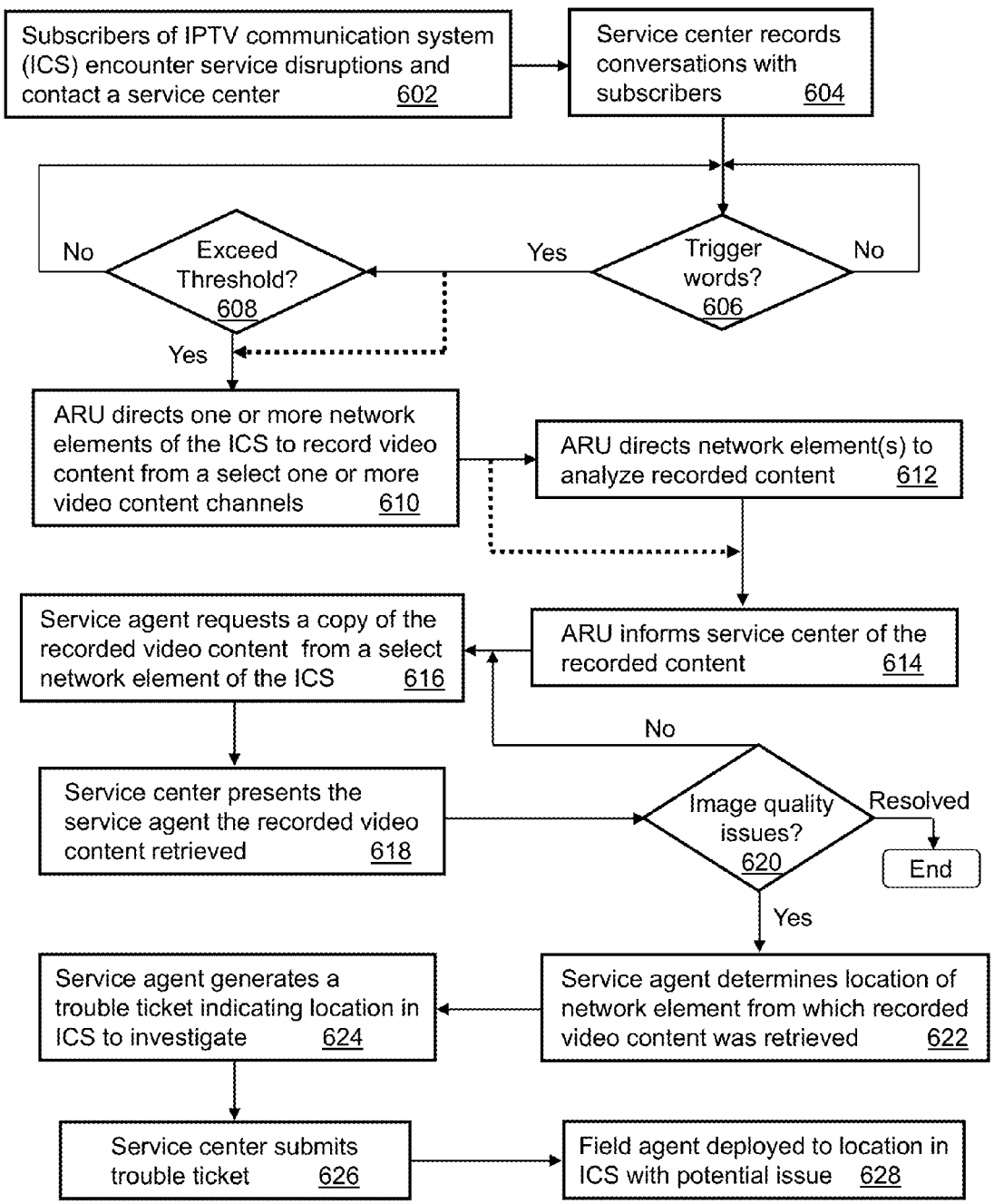
FIG. 6 depicts an exemplary method operating in portions of the communication systems of FIGS. 1-4.

FIG. 6 depicts an exemplary method 600 operating in portions of communication systems 100-400. Method 600 begins with step 602 in which subscribers of the previously described media communication systems (such as for example an IPTV communication system or ICS) encounter service disruptions which prompts them to contact a service center 133. The service center 133 can inform the subscribers upon accepting their calls that conversations will be recorded as a quality measure to improve services. As conversations between the subscribers and a human agent or IVR system are being recorded, the ARU 130 can be programmed to monitor in step 606 these conversations for the presence of trigger words. Trigger words can be defined by a service provider to detect and promptly address service disruptions.

The ARU 130 can be programmed to search for words singly or in combination. For instance, the ARU 130 can be programmed to search for trigger words such as "not", "dead", "out of service", "disruption", "not working", "black out", "fuzzy", "ghosting", "no signal", "signal loss", and so on. The service provider can define hundreds if not thousands of possible trigger words. In another illustrative embodiment, the ARU 130 can utilize dictionary definitions, thesaurus definitions, or definitions from common language references to identify words, and/or phrases in one or more languages of interest (e.g., English, Spanish, French, German, etc.) that are commonly used to describe problems. The service provider can also combine its own definitions and reference sources to create a library of trigger words. The ARU 130 can be programmed with common syntactical, grammatical or other language interpretive software to monitor and respond to trigger words.

When trigger words are detected, the ARU 130 can proceed to step 608 where it can determine if a frequency of use of the trigger words exceeds a threshold established by the service provider to achieve desired quality objectives. Alternatively, or in combination the threshold can be established by the service provider using statistical techniques to achieve a particular sigma level mitigation response to improve network quality. For example, suppose 10 subscribers complain about losing premier channel service (e.g., HBO) in the span of a 15 minute period. A threshold of having a running average of 3 complaints can be set so that a higher frequency of occurrence of complaints is to be addressed immediately by the ARU 130, while a lower frequency of complaints can be ignored and the ARU can continue to monitor conversations in step 606.

It would be apparent to an artisan of ordinary skill in the art that the threshold setting can be dynamically controlled by the ARU 130, and that any level of sophistication can be used by the ARU to calculate the frequency of occurrences of trigger words. It would also be apparent to the artisan that the ARU 130 can be programmed to respond to all trigger words without a threshold limitation as set forth in step 608. In yet another embodiment, the ARU 130 can be programmed to ignore a threshold in instances when particular trigger words considered by the service provider of the ICS as critical (e.g., "dead", "no signal", etc.) are detected. In sum, any combination of threshold or non-threshold combinations can be considered by the ARU 130.

Upon detecting for example an excess in frequency of use of the trigger words, the ARU 130 can proceed to step 610 to direct one or more network elements of the ICS to record video content from a select one or more video content channels. The ARU 130 can select which network elements will be engaging in the recording step by analyzing ancillary words recorded near the trigger words detected. Suppose for example that a number of subscribers are detected by the ARU 130 to be raising issues about a premium channel (e.g., subscriber 1: "my HBO channel is not working", subscriber 2: "my HBO channel is dead", subscriber 3: "I am not receiving a signal on my HBO channel", and so forth). From these excerpts, the ARU 130 can detect that the HBO channel is the video channel being addressed by the subscribers. Accordingly, the ARU 130 request a recording of the HBO channel as opposed to other channels.

Additionally, the ARU 130 can identify one or more transmission paths of potential service disruption serving the subscribers who generated the trigger words. The one or more transmission paths can be identified from one or more subscriber accounts or communication identifiers (e.g., caller ID) retrieved from communication sessions between the service center 133 and the portion of the plurality of subscribers providing the exemplary excerpts noted above. The subscriber accounts can provide the subscribers' address, and/or caller IDs of the subscribers may provide by way of area codes and exchange codes a location of the subscribers. With this information, the ARU 130 can identify network elements that are servicing the subscribers on one or more transmission paths.

As noted previously, the network elements selected can be located in any path of the ICS (e.g., SHS, VHO, VHS, and/or the subscribers premises). When the ARU 130 chooses a subscriber's premise, the network element in this illustration can be represented by the STB and/or DVR coupled thereto that is located at the subscriber's premise. It should be further noted that the network elements can include DVR functionality in the network equipment of the ICS, or can be coupled by way of a common video port (e.g., coax, HDMI, etc.) to an STB with a built-in DVR, or a standalone DVR.

For efficient use of memory resources, the ARU 130 can direct the network elements selected to record video channels for a limited time (e.g., 15 seconds). The ARU 130 can also direct said network elements to purge recordings after a given period (e.g., 72 hours), or as directed by the service center 133.

Once the recordings have taken place, the ARU 130 can proceed to step 612 where it directs the network elements selected in step 610 to analyze the recorded content. The network elements can perform this function by directing common image testing equipment coupled thereto or integrated therewith to analyze the recorded video recordings and thereby generate an image quality indicator which can be supplied with the recorded video content. The test equipment can for example detect ghosting issues, image jitter, frame losses or corruption, and other common image quality factors to produce the image quality indicator. The image quality indicator can be represented by a numeric indicator (e.g., a quality scale from 1-10) each increment having a particular meaning (1-no signal; 2-severe signal loss; 3-frame loss/corruption, etc.).

Alternatively, the image quality indicator can be represented by a plurality of quality factors which can be described in words, alphanumerically, and/or by statistical metrics. In another illustrative embodiment, the ARU 130 can skip step 612 and proceed to step 614. In this embodiment, reliance would be placed on a service agent of the service center 133 to perform a qualitative analysis of the recorded video content presented thereto as will be described shortly.

At step 614, the ARU 130 can inform the service center 133 of the recorded content. The notice can be directed to for example a service agent which may be in the midst of addressing the subscriber's issues in real-time. Responsive to said notice, the service agent in step 616 can request a copy of the recorded video content from one of the network elements identified in the notice. The computing devices at the service center 133 can then retrieve the video content from the selected network element operably coupled to the service center 133 by common means (e.g., ISP network 132). Once retrieved, the service center 133 can present the content in step 618 on a computer terminal used by the requesting service agent. In step 620, the service agent can determine if there's an image quality issue from the presented video content and/or the image quality indicator presented therewith. If the service agent does not find an identifiable issue in step 620 with the video recording presented, the service agent can proceed to step 616 and request a recording from another network element.

To assist the service agent, the service center 133 can present a map of network elements supplying services to the subscriber's premises. Additionally, the service center 133 can highlight which of the network elements in the path have video recordings identified by the ARU 130. The service agent can in turn select any of the network elements highlighted in the path (upstream, intermediate, or downstream) to request a video recording. Thus, the service agent can gradually trace the path until a source of disruption is identified (if any). If the service agent does not discover any issues in step 620, or the subscriber's concerns have been addressed by other means, method 600 can be terminated, and restarted for other occurrences identified by the ARU 130.

If a service disruption is identified, the service agent can proceed to step 622 to determine a location of the network element from which the recorded video content was retrieved. The location of the network element can be identified on the screen presented to the service agent with the highlight network path, or the service agent can cross-reference an identifier of the network element selected in step 616 with a network management system operably coupled to the service center 133 that tracks network elements locations in the ICS. In step 624, the service agent can generate by means provided by the service center 133 a trouble ticket indicating one or more locations in the ICS network to investigate a potential service disruption which is at or near the location of the network element identified in step 622. The service center 133 submits in step 626 the trouble ticket to one or more field agents who are associated with servicing the location(s) identified in step 622. Responsive to the trouble ticket submission, field agent(s) are deployed in step 626 to the location(s) in the ICS to mitigate the potential service disruption issues.

The foregoing embodiments of method 600 provide a rapid response means to address potential service disruption issues identified by subscribers.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that it is applicable to any media communication system including for example cable TV, satellite TV, and media content distribution systems from on the Internet (e.g., iTunes™). Additionally, method 600 can be adapted for any form of media content including audio-only content (e.g., high definition music, streaming audio, audio from radio stations, etc.). In this embodiment, the ARU 130 can direct recordings of audio-only content at one or more network elements. The service agent in turn can retrieve audio recordings and listen to a presentation thereof for qualitative analysis. The network elements can also be equipped with common test equipment to analyze the quality of recorded audio-only content, and thereby provide the service agent an audio quality indicator to further determine if a service disruption is present needing prompt attention by field agents.

Other suitable modifications can be applied to the present disclosure without departing from the scope of the claims below. Accordingly, the reader is directed to the claims section for a fuller understanding of the breadth and scope of the present disclosure.

Figure 7:
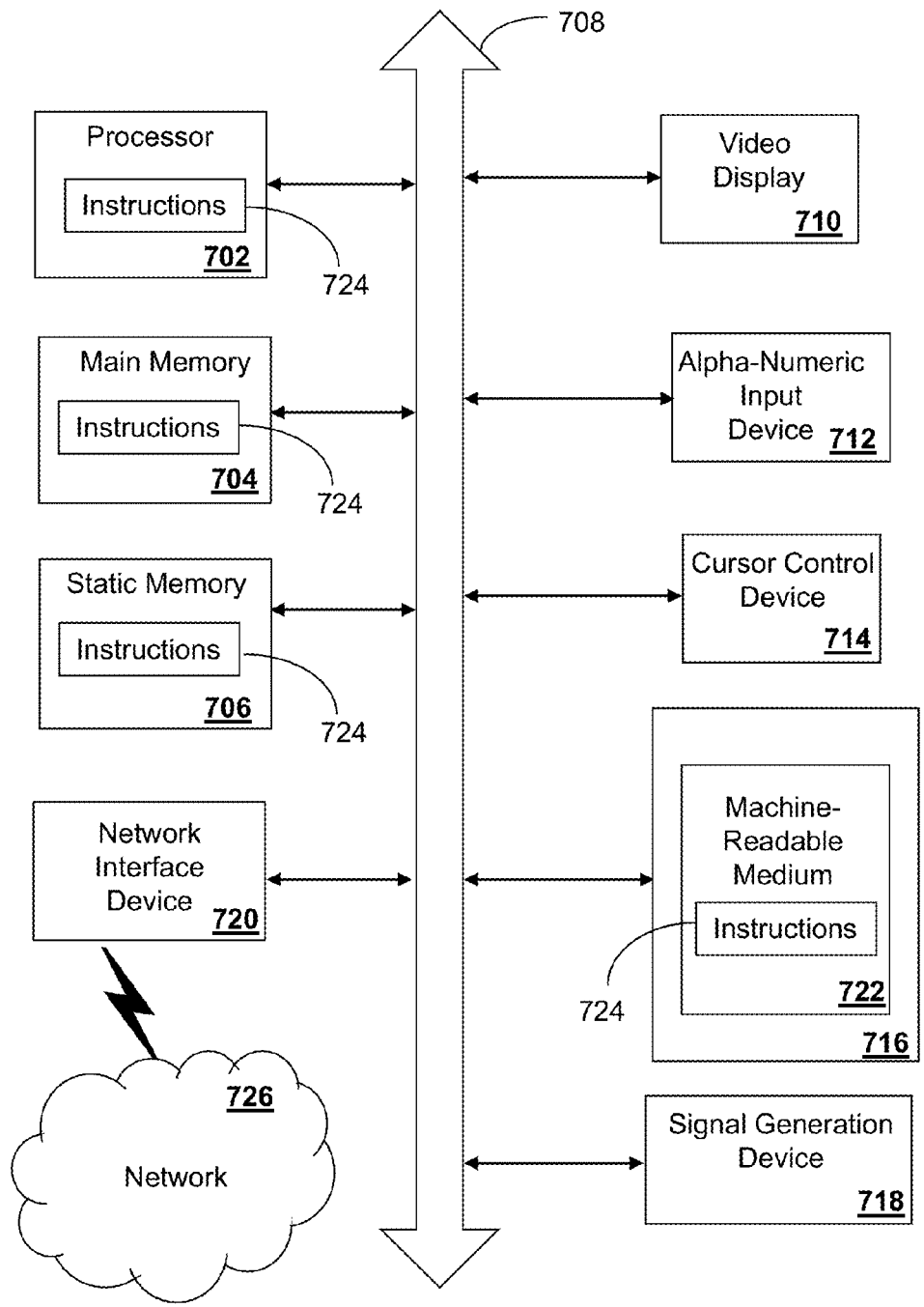
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    recording, by a system including a processor, audio feedback from communication devices of a plurality of subscribers commenting on video content services supplied by an internet protocol television communication system;
    detecting, by the system, a plurality of trigger words in the recorded audio feedback;
    detecting, by the system, a frequency of use of the plurality of trigger words that exceeds a threshold;
    directing, by the system, a plurality of network elements of the internet protocol television communication system to record video content from a select one of a plurality of video content channels;
    detecting, by the system, in the recorded audio feedback a plurality of ancillary words in proximity to the detected plurality of trigger words;
    selecting, by the system, the one of plurality of video content channels for recording the video content according to the plurality of ancillary words detected;
    identifying, by the system, a subscriber from the plurality of subscribers that supplied audio feedback matching the plurality of trigger words;
    identifying, by the system, a transmission path from a subscriber account associated with the identified subscriber, and communication identifiers determined from communication sessions with the identified subscriber; and
    selecting, by the system, the plurality of network elements to record media content from the identified transmission path;
    wherein the audio feedback is recorded from conversations between the plurality of subscribers and service agents of the internet protocol television communication system, and
    wherein a service agent of the internet protocol television communication system retrieves from one of the plurality of network elements a portion of the recorded video content.

2. The method of claim 1, comprising directing each of the plurality of network elements to conduct an image quality analysis of the recorded video content, thereby generating an image quality indicator.

3. The method of claim 2, wherein the service agent retrieves the image quality indicator with the portion of the recorded video content.

4. The method of claim 1, wherein the service agent identifies a quality issue with the retrieved video content.

5. The method of claim 4, wherein the service agent notifies a field agent of a first location in the internet protocol television communication system where a service disruption may be occurring.

6. The method of claim 5, wherein the first location in the internet protocol television communication system has an association with a second location of the network element from which the service agent retrieved the video content.

7. The method of claim 1, wherein the plurality of network elements are located in one of a plurality of locations comprising one of a super headend office, a video headend office, premises of a subscriber, or combinations thereof.

8. The method of claim 1, wherein each of the plurality of network elements is coupled to a corresponding digital video recorder that records video content from the selected one of the plurality of video content channels.

9. A non-transitory computer-readable storage medium, comprising computer instructions which when executed by a processor cause the processor to perform operations comprising:
- detecting plurality of trigger words in recorded audio feedback from communication devices of a plurality of subscribers commenting on video content services supplied by an internet protocol television communication system; and
- responsive to a characteristic of said detection, directing a plurality of network elements of the internet protocol television communication system to record video content from a select one of a plurality of video content channels,
- wherein the plurality of network elements are selected based on a transmission path identified from a subscriber account associated with one of the plurality of subscribers,
- wherein the one of the plurality of video content channels is selected based on a plurality of ancillary words of the recorded audio feedback in proximity to the detected plurality of trigger words,
- wherein a service agent of the internet protocol television communication system retrieves from one of the plurality of network elements a portion of the recorded video content, and
- wherein the characteristic of said detection corresponds to computer instructions for detecting a frequency of use of the plurality of trigger words that exceeds a threshold.

10. The non-transitory storage medium of claim 9, wherein the operations further comprise directing each of the plurality of network elements to conduct an image quality analysis of the recorded video content, thereby generating an image quality indicator.

11. The non-transitory storage medium of claim 10, wherein the service agent retrieves the image quality indicator with the portion of the recorded video content.

12. The non-transitory storage medium of claim 11, wherein the service agent detects a quality issue with the retrieved video content according to the image quality indicator and a presentation of the retrieved video content.

13. The non-transitory storage medium of claim 12, wherein the service agent notifies a field agent of a first location in the internet protocol television communication system where a service disruption may be occurring.

14. The non-transitory storage medium of claim 13, wherein the first location in the internet protocol television communication system has an association with a second location of the network element from which the service agent retrieved the video content.

15. A recording device, comprising:
- a memory to store computer instructions; and
- a controller coupled with the memory, wherein the controller, responsive to executing the computer instructions, performs operations comprising:
- recording video content from a select one of a plurality of video content channels of an interactive television communication system responsive to receiving a directive from a system detecting a plurality of trigger words in recorded audio feedback of a plurality of subscribers commenting on video content services supplied by an internet protocol television communication system,
- wherein the select one of the plurality of video content channels is selected based on a plurality of ancillary words of the recorded audio feedback in proximity to the detected plurality of trigger words,
- wherein the recording device corresponds to a digital video recorder coupled to a network element of the internet protocol television communication system; and
- transmitting to a service center by way of the network element coupled thereto a portion of the recorded video content.

16. The recording device of claim 15, wherein the network element is located at a super headend office.

17. The recording device of claim 15, wherein the network element is located at a video headend office.

18. The recording device of claim 15, wherein a service agent of the service center identifies a quality issue with the recorded video content.

19. The recording device of claim 18, wherein the service agent notifies a field agent of a first location in the interactive television communication system where a service disruption may be occurring.

20. The recording device of claim 19, wherein the first location in the interactive television communication system has an association with a second location of the network element from which the service agent retrieved the video content.

* * * * *